Patented May 19, 1953

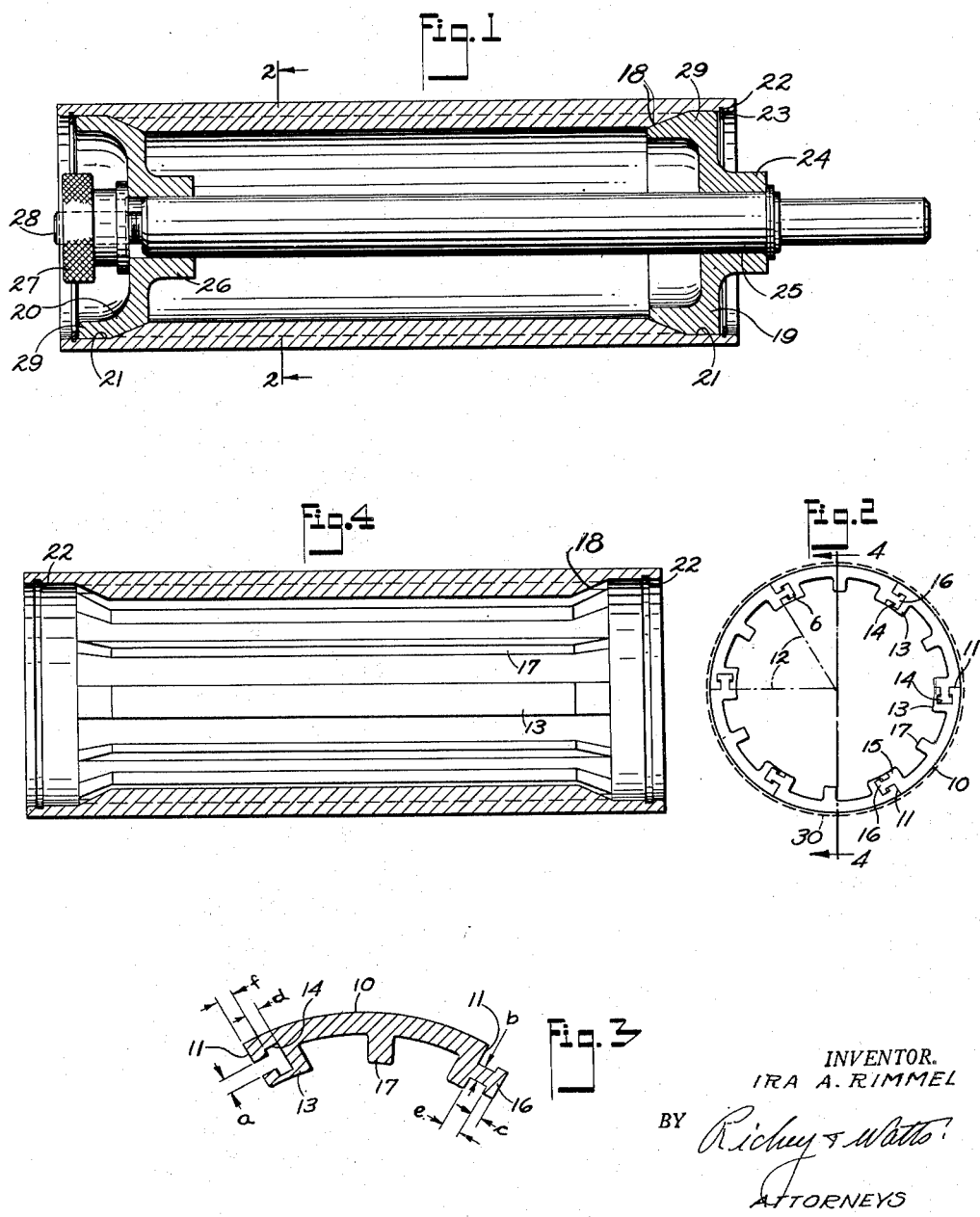

2,638,722

UNITED STATES PATENT OFFICE 2,638,722

MANDREL

Ira A. Rimmel, Lakewood, Ohio, assignor to The Kindt-Collins Company, Cleveland, Ohio, a corporation of Ohio Application November 2, 1950, Serial No. 193,700

8 Claims. (Cl. 51—190)

This invention relates broadly to improvements in mandrels for the support of abrasive coated paper tubes such as are used in vertical spindle sanding machines.

One of the objects of the invention is to provide a mandrel embodying a tubular body formed with articulated staves and frusto-conical end plates designed to facilitate the circumferential distention thereof.

Another object of the invention is to provide a mandrel which is relatively light in weight and of uniform cross-section in order to eliminate the vibration and torsional strains customarily imposed upon the spindle bearings by mandrels of the type heretofore in use.

Another object of the invention is to provide a clearance between the inter-engaged parts of the staves or segments which will accommodate the requisite expansion of the mandrel.

Further objects of the invention reside in the provision of a mandrel which is economic of manufacture, sturdy of structure, durable, and susceptible of operation with ease and dispatch.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 1 is a vertical sectional view of the improved mandrel;

Fig. 2 is a transverse sectional view of the mandrel taken on a plane indicated by the line 2—2 in Fig. 1;

Fig. 3 is a cross-sectional view, shown upon an enlarged scale, of one of the segments of the mandrel; and Fig. 4 is a longitudinal sectional view of the mandrel stave assembly taken on a plane indicated by the line 4—4 in Fig. 2.

Referring first to Fig. 2, the mandrel comprises a plurality of staves or segments 10 of rectilinear form and arcuate transverse section. The sides 11 of the segments are formed with lineal ribs protruding inwardly from the concave face thereof, one of the ribs 13 having a T-slot 14 therein and the other rib 15 having a tongue or T-rail 16 thereon formed for engagement in the slot 14 in the rib 13 of the adjacent segment of the assembly. In the exemplary embodiment illustrated, the mandrel is formed of six segments of equal size and form, the angular relation of the side walls 11 being defined by the radii 12. The inner concave face of the segments are reinforced by lineal ribs 17, the end portions 18 thereof, as well as like parts of the ribs 13 being beveled inwardly for the reception of frusto-conical plugs or tapered end plates 19 and 20. As will be seen in Figs. 1 and 4, the ribs terminate adjacent the ends of the mandrel in cylindrical bores 21 having grooves 22 therein for the support of split rings 23. The lower end plate 19 is formed with a depending boss 24 bored for the reception of the spindle 25 which is supported in the customary manner in a chuck or spring collet in the machine. The lower face of the upper end plate 20 is provided with a boss 26 which is bored to receive the spindle 25, and the upper face thereof is recessed to provide clearance for a thumb nut 27 threaded on the diametrically reduced end 28 of the spindle. The outer ends of the plates 19 and 20 are machined with cylindrical body portions 29 proportioned for free entry within the bores 29 in the mandrel assembly.

In operation, the nut 27 is first loosened to assure the retraction of the conical end plates from their seated engagement with the beveled ends of the ribs. The staves or segments are next pressed together to the limit of their contracted position as determined by the clearance 6 between the T-slots 14 and mating rails 16.

In practice it has been found that satisfactory results may be obtained in a four-inch mandrel by forming the opening $a$ in the throat of each T-slot three-thousandths of an inch larger than the neck $b$ of the T-rail, by providing a clearance twenty-five thousandths of an inch between the thickness $c$ of the head of the T-rail and the depth $d$ of the transverse slot therefor, and allowing thirty-two thousandths of an inch between the height $e$ of the neck of the T-rail and the width $f$ of the ribs forming the throat of the T-slot.

The abrasive tube 30 (indicated by dotted lines) is next mounted in telescopic relation with the mandrel, then the nut 27 is tightened to draw the conical plates 19 and 20 into engagement with the beveled end portions of the ribs 13 and 17. As the cones wedge the segments apart, the outer faces thereof will impinge the inner face of the abrasive tube with sufficient pressure to restrain the rotation thereof upon the mandrel when the outer abrasive face of the tube is brought into contact with the work.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A mandrel for the support of an abrasive coated tube comprising a plurality or rectilinear segments of arcuate transverse section, one side of each segment having a T-slot therein, a T-rail on the opposed side of each segment loosely engaged in the T-slot in a contiguous segment, the assembled segments defining a hollow cylindrical body, frusto-conical plates engaged with the ends of the cylindrical body, and means for drawing the frusto-conical plates toward each other to effect the distention of the segments.

2. A mandrel for the support of an abrasive coated paper tube comprising a hollow cylindrical body embodying a plurality of rectilinear segments of arcuate cross-section, each segment having a T-slot in one side thereof, a T-rail on the opposed side of each segment loosely engaged with the T-slot in the contiguous segment, beveled end portions on said segments, tapered plates engaged with the beveled end portions of said segments, and a draw bar in said tapered plates for forcing the said plates in impinged relation with the beveled end portions on the segments.

3. A mandrel for the support of a sandpaper tube comprising a plurality of rectangular staves of arcuate cross-section circumferentially interlocked with each other along their lineal edges and defining a hollow cylindrical body, tapered seats in the ends thereof, tapered end plates engaged with said seats, a threaded spindle in said tapered end plates, and a nut on said spindle for drawing the tapered end plates toward each other.

4. A mandrel for the support of a sanding tube comprising a plurality of staves of arcuate cross-section having T-slots on one edge thereof, T-rails on the opposed edge of each stave engaged with the slot of a contiguous segment, said staves forming a hollow cylindrical body, tapered plugs in each end of said cylindrical body, a spindle in said plugs, and means thereon for drawing the said plugs toward each other.

5. A mandrel for tubular sandpaper cylinders comprising a plurality of rectangular segments of arcuate cross-section, lineal ribs on the sides thereof, the rib on one side of each segment having a T-groove therein, a T-rail on the opposed side of each segment formed for engagement with clearance in the T-slot in a contiguous segment, said segments forming a hollow cylindrical body in their assembled relation, tapered plugs in the ends of the cylindrical body, a threaded spindle in said plugs, and a nut on said spindle for drawing the plugs toward each other within the limits of the clearance between said T-rails and slots.

6. A mandrel for sandpaper tubes comprising a plurality of rectilinear segments of arcuate cross-section, lineal ribs on the sides thereof, radially overlapped pivotal connections having clearance therein in the side ribs of said segments, and means engaged with the ends of said segments for forcing the segments outwardly within the limits of the clearance of the pivotal connections.

7. An abrasive tool comprising an expansible mandrel embodying a plurality or rectangular segments of arcuate cross-section, expansible circumferentially locked joints between adjacent segments along the lineal edges thereof, a non-expansible sandpaper tube surrounding the segment assembly, and tapered plates in the end portions of said segment assembly forcing the segments into intimate engagement with the interior of said sandpaper tube.

8. An abrasive tool embodying a sandpaper tube and a mandrel for the support thereof, said mandrel comprising a plurality of rectangular segments of arcuate cross-section, expansible circumferentially locked joints uniting the lineal edges of each segment, a non-expansible open-ended abrasive coated cylinder on said mandrel, and tapered wedges in the ends of the segment assembly tensioning said hinges and pressing the segments against the inner wall of said cylinder.

IRA A. RIMMEL.

References Cited in the file of this patent

UNITED STATES PATENTS

| Number | Name | Date |
|---|---|---|
| 303,233 | Ryfenburough et al. | Aug. 5, 1884 |
| 304,533 | Lieb | Sept. 2, 1884 |
| 369,513 | Fox et al. | Sept. 6, 1887 |
| 667,273 | Webster | Feb. 5, 1901 |
| 2,410,536 | Vonnegut | Nov. 5, 1946 |